J. H. DONAHOO.
SHOCK ABSORBER.
APPLICATION FILED JUNE 10, 1916.
1,260,761.
Patented Mar. 26, 1918.
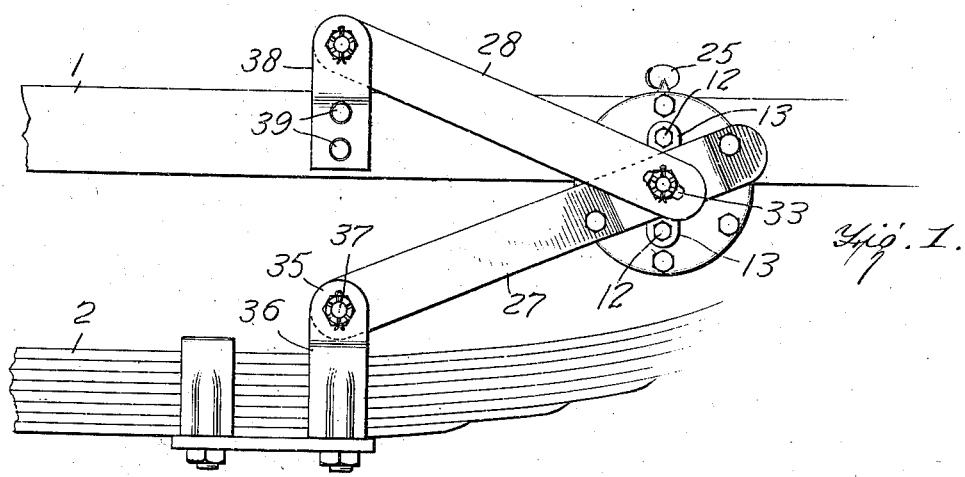
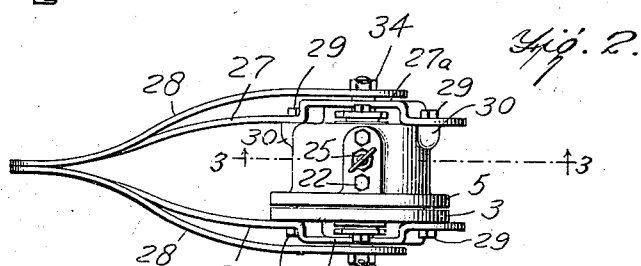
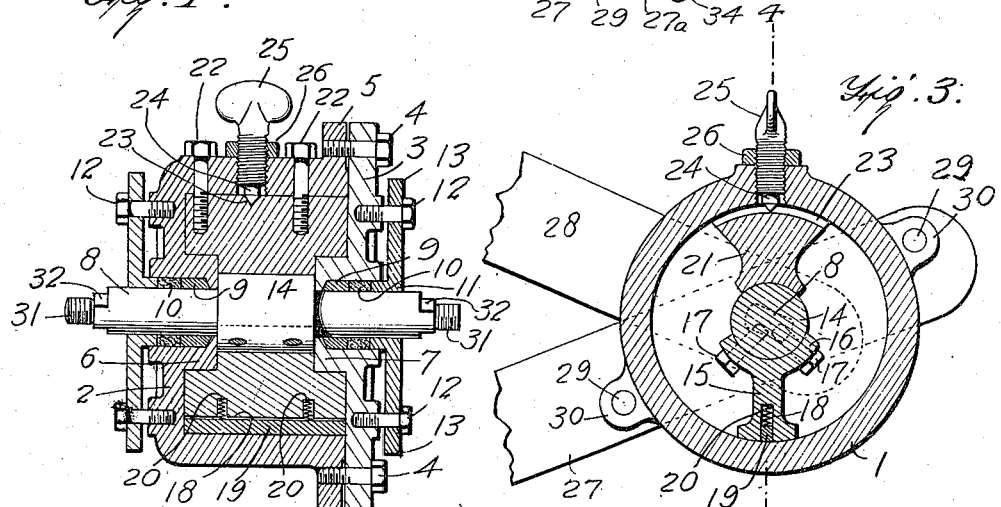
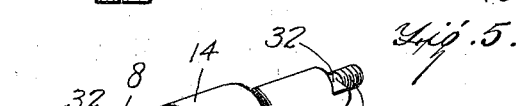
WITNESSES:
L. H. Schmidt
W. E. Beck
INVENTOR
JOHN H. DONAHOO,
BY
Munn & Co.
ATTORNEYS

UNITED STATES PATENT OFFICE.

JOHN HENRY DONAHOO, OF FOSTORIA, TEXAS, ASSIGNOR OF ONE-FOURTH TO E. R. GOODWIN, OF FOSTORIA, TEXAS.

SHOCK-ABSORBER.

1,260,761.  Specification of Letters Patent.  Patented Mar. 26, 1918.

Application filed June 10, 1916. Serial No. 102,887.

*To all whom it may concern:*

Be it known that I, JOHN H. DONAHOO, a citizen of the United States, and a resident of Fostoria, in the county of Montgomery and State of Texas, have invented a new and useful Improvement in Shock-Absorbers, of which the following is a specification.

My invention is an improvement in shock absorbers, and the invention has for its object to provide a device of the character specified, adapted for use with vehicles of every kind, and of the type adapted to be arranged between the two elements to be cushioned, and comprising a casing for containing liquid as for instance, oil, and adapted for connection with one of the elements and a piston movable in the cylinder and adapted for connection with the other element and having a restricted port for the passage of the oil, the port being adjustable in capacity to provide for variations in resiliency.

In the drawings:—

Figure 1 is a side view of a portion of the vehicle with the device in place,

Fig. 2 is a top plan view of the absorber,

Fig. 3 is a section on the line 3—3 of Fig. 2, looking in the direction of the arrows adjacent to the line, Fig. 4 is a section on the line 4—4 of Fig. 3, and Fig. 5 is a perspective view of the shaft.

The present embodiment of the invention is shown in connection with a portion of the frame 1 of a vehicle, and the springs 2, the absorber being arranged between the frame and the springs.

The improvement comprises a substantially cylindrical casing, composed of a body 1, having one end closed at 2, and having a head 3 detachably connected to the other end by means of machine bolts 4, which are passed through the head and through a marginal flange 5 on the adjacent end of the body 1 of the casing.

The closed end of the casing is provided with an inwardly extending cup-shaped stuffing box 6, and the head 3 has a similar box 7, the said boxes being in alinement, and a shaft 8 is journaled in the stuffing boxes. Bushings 9 are arranged within the stuffing boxes at the bottoms thereof, and packings 10 are arranged adjacent to the bushings. The outer ends of the boxes are closed by packing nuts 11, which fit within the stuffing boxes around the shaft 8. and are held in place by set screws 12, passing through oppositely arranged lugs 13 on the packing nuts, and engaging the closed end 2 of the casing and the head 3, respectively.

The shaft 8 is provided with an annular enlargement 14 intermediate its ends, and of a length to fit between the inwardly offset stuffing boxes 6 and 7. A blade or vane 15 is secured to the shaft, the said blade or vane forming a piston, and the vane has a semi-circular flange or web 16 at its inner end which fits the enlargement 14, and screws 17 are passed through registering openings in the flange and into engagement with the enlargement.

The vane is shaped to fit the casing, the outer end being rounded to fit the interior of the body 1 of the casing, and at the said rounded outer end the vane has a recess 18 in which is arranged a packing strip 19, the said strip being forced outward into closed contact with the inner surface of the body 1 of the casing by means of springs 20, arranged in openings in the bottom of the recess or groove 18.

An abutment 21 is detachably connected with the body of the casing inside the same, the inner end or edge of the abutment being rounded to fit the enlargement 14 of the shaft, and the outer end or edge of the abutment is rounded to fit the inner surface of the body 1 of the casing. The abutment is held in place by set screws 22, which are passed through openings in the casing into engagement with threaded openings in the abutment, and the abutment has a V-shaped passage 23 at approximately its center.

The inner pointed end 24 of a set screw 25 engages the groove or passage 23, and the said set screw acts as a valve to close or partially close the passage 23. The set screw is threaded through a boss in the casing and a lock nut 26 is threaded on to the set screw outside of the casing. It will be evident that by turning the set screw 25 inwardly or outwardly the capacity of the port or passage 23 may be varied.

The casing 1—2—3 is connected to one of the elements to be cushioned, the spring in the present instance, by means of a pair of arms or hangers 27, and the shaft 8 is connected to the other element, the frame in the present instance, by arms or hangers 28. The arms 27 are arranged at opposite ends of the casing, at the heads 2 and 3, and are secured to the casing by means of set screws or bolts 29, which are passed through openings in the arms into engagement with openings in the head 3 and in lugs 30 extending radially from the casing at the closed end 2.

At the packing nuts or glands 11 each of the arms 27 is offset outwardly as shown at 27$^a$ to pass the nuts or glands, and the arms 28 are secured to the ends of the shaft 8. Each of the ends of the shaft has a threaded reduced extension 31 and at the inner side of each of the extensions the shaft is flattened on opposite sides as indicated at 32 to form a substantially rectangular portion near each end of the shaft.

The arms 28 have slots 33 at the end adjacent to the shaft, and these slots fit over the flattened portions 32. Nuts 34 are threaded on to the threaded portion 31 of the shaft to hold the arms in place. The members of each pair of arms 27 and 28 are brought together at their outer ends to lap upon each other as shown in Fig. 2, and the other ends of the arms 27 are connected to an upstanding lug 35 on one of the holding clips 36 for the spring, by means of a bolt and nut 37. The arms 28 at their outer ends are connected to a lug 38 secured to the frame, by rivets 39 or the like.

The operation of the device is as follows:—

A suitable quantity of liquid, as for instance glycerin or the like, is placed in the interior of the casing, and after the device is secured in place it is ready for operation. The parts normally occupy the position shown in Fig. 3, that is, with the vane 15 in alinement with the abutment 21, and the two compartments formed in the casing by the blade and the abutment are approximately equal in capacity. The liquid is divided in these two compartments, and it will be evident that when the shaft is moved angularly with respect to the casing in either direction one compartment will be lessened in capacity while the other will be increased.

The oil in the first-named compartment will be passed into the second-named compartment, but it must pass through the restricted port and as a consequence the shock and jar of the two elements moving toward each other will be cushioned or absorbed. When the parts return to their normal position the oil passes in the opposite direction, and by means of the valve 25 the capacity of the port 23 may be varied.

The packing strip 19 insures a fluid tight joint between the piston and the cylinder or casing. By removing the head 3 access may be had to the interior of the casing should for any reason this be necessary. When the head 3 is removed the shaft and the piston may also be removed as well as the abutment.

I claim:—

A shock absorber comprising a casing of cylindrical form having one end closed, and a head for closing the open end, a shaft journaled at the axis of the casing, the closed end of the casing and the head having inwardly projecting packing boxes, and the shaft having its ends reduced to form shoulders abutting the inwardly extending boxes, a vane connected with the shaft within the casing, an abutment connected with the casing within the same, said casing being adapted to contain a liquid and having a by-pass at the abutment, and the abutment having a peripheral V-shaped passage for the liquid, a valve coöperating with the passage to vary the capacity thereof, and hangers connected with the casing and the shaft for connection with elements to be cushioned.

JOHN HENRY DONAHOO.

Witnesses:
 BEN J. PARROTT,
 GEO. N. SHERMAN.